Figure 1:
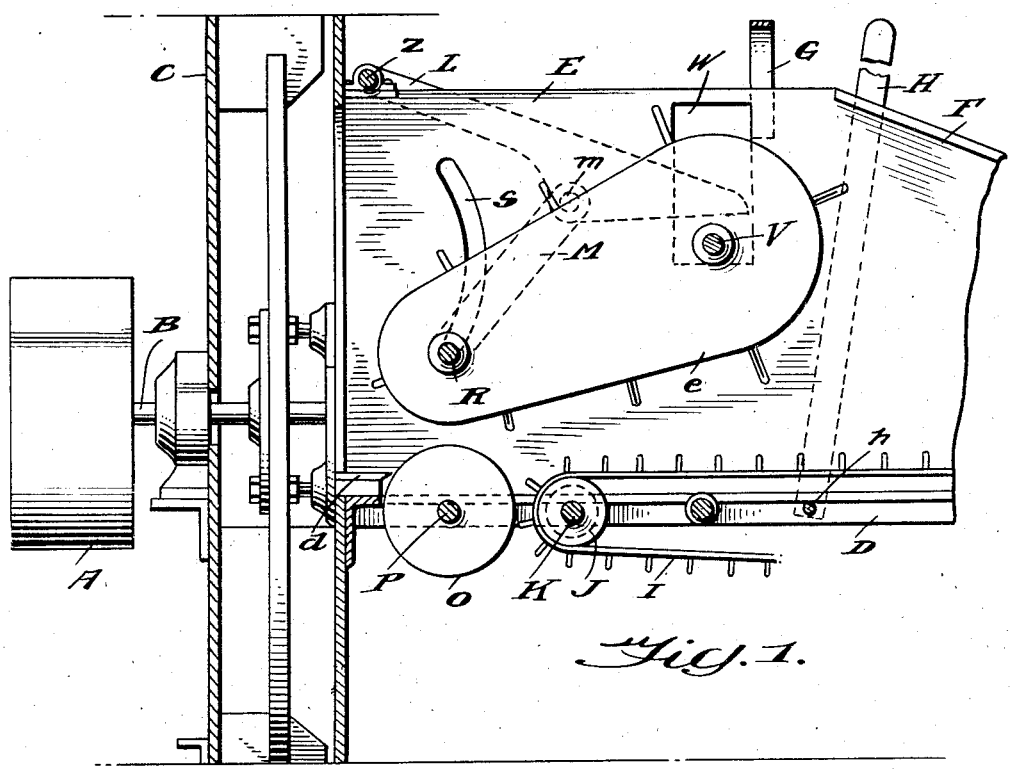

Dec. 3, 1946.　　M. L. SENSENIG　　2,412,179
CONVEYER
Filed July 16, 1945　　3 Sheets-Sheet 1

Inventor
Miles L. Sensenig,
By Babcock & Babcock
Attorneys

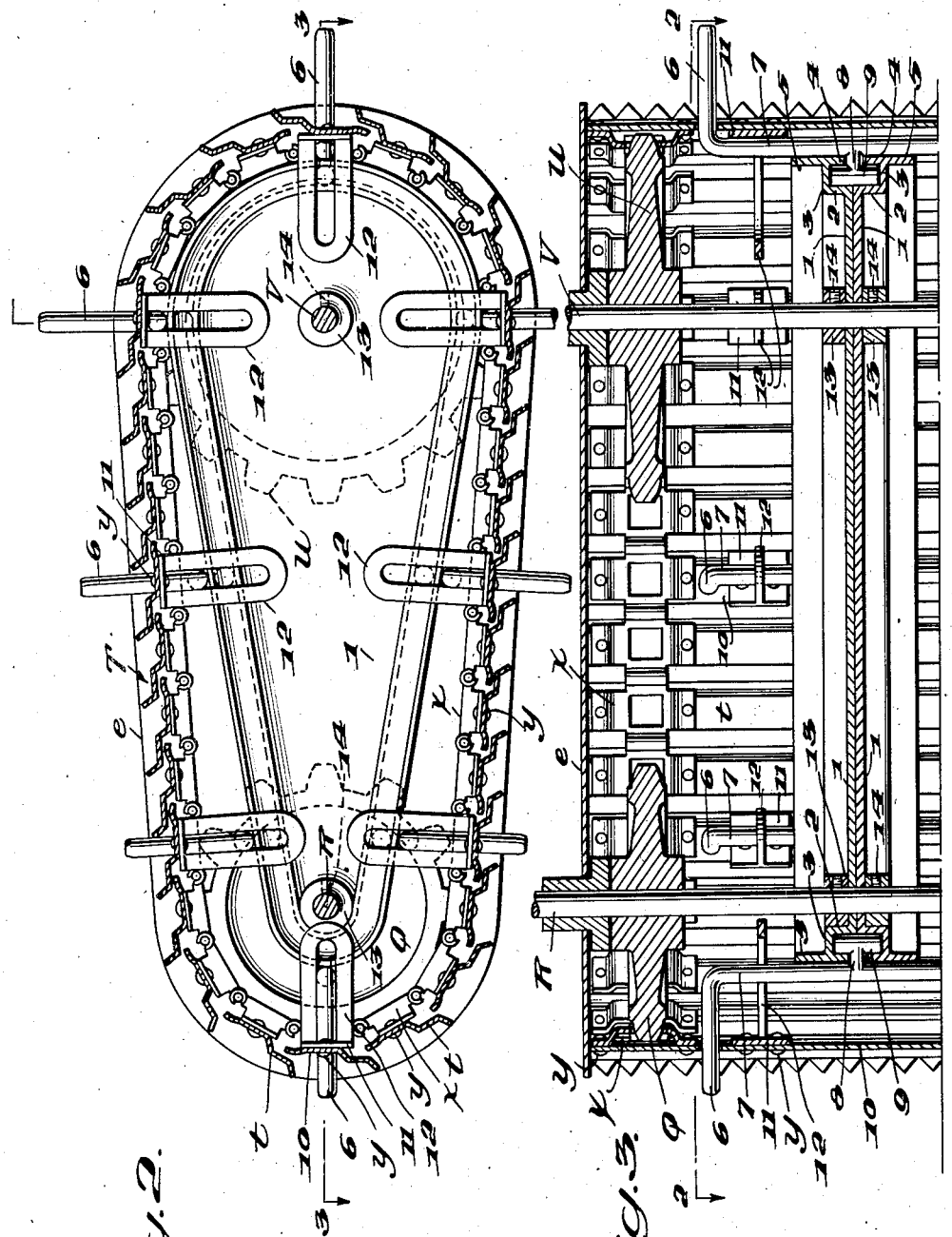

Dec. 3, 1946.  M. L. SENSENIG  2,412,179
CONVEYER
Filed July 16, 1945   3 Sheets-Sheet 3
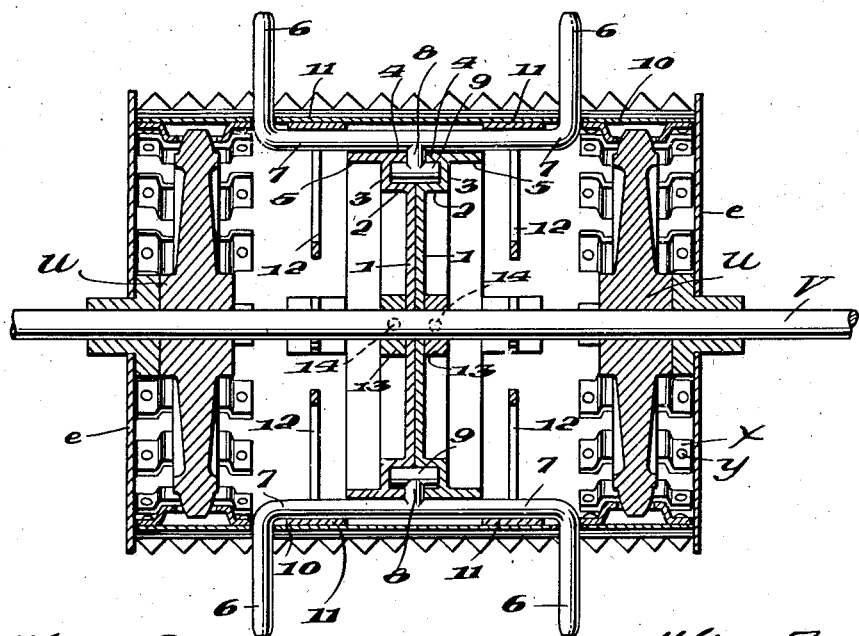
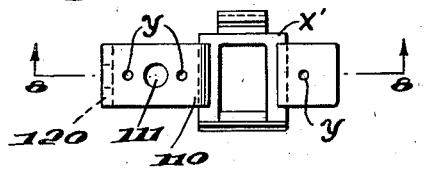
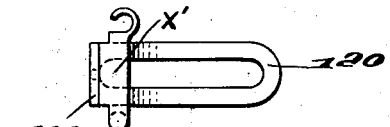
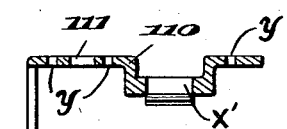
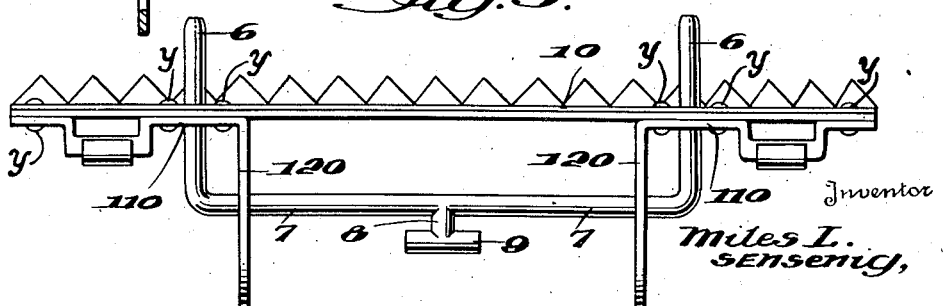
Inventor
Miles L. Sensenig,
By Babcock & Babcock
Attorneys Patented Dec. 3, 1946

2,412,179

UNITED STATES PATENT OFFICE 2,412,179

CONVEYER

Miles L. Sensenig, Lancaster, Pa., assignor to Dellinger Manufacturing Company, a corporation of Pennsylvania Application July 16, 1945, Serial No. 605,314

6 Claims. (Cl. 198—197)

1

This invention relates to conveyers and more particularly to the combination of a supplementary extendible and retractible finger feed with an endless band type conveyer primarily intended for use as part of the feeding means for various pieces of farm equipment such as ensilage or straw cutters or other equipment wherein the raw roughage material such as corn, corn fodder, grass hay, pea vines, limp grass, alfalfa hay, straw and other roughage material is to be treated, usually being dumped upon or fed to a traveling belt table or other conveyer and carried by the latter to the feed means which grasp it from the feeding table or conveyer and feed it between them to the cutter or chopper or other processing machinery.

In such equipment it is usual and known to mount the lower feed roll for rotation about a fixed axis and the upper feed roll or a portion of the upper feed means so that it will move upward and downward away from and toward the fixed feed roll to accommodate the varying thicknesses of the mass or layer of roughage material being fed.

The primary objects of the present invention are: to provide a unitary feed element or assemblage combining an endless band conveyer or impeller with a plurality of extensible and retractible feeding fingers moving with said band conveyer and braced or held against relative swinging movement longitudinally of said band conveyer and progressively extended or projected and retracted or withdrawn beyond and toward the outer face of said endless band conveyer as the same moves in its given path; to provide such a unit or assemblage of such construction that it may be mounted for swinging movement; to provide bracing and guiding means for said fingers to hold them to a straight path of reciprocatory movement; to provide a simple and efficient construction of feed fingers and braces and guides therefor that may be easily and quickly applied to an endless band conveyer; to provide an improved form of feeding finger device in combination with a stationary cam or track functioning to extend and retract said feeding fingers and at all times to support them in their extreme extended and retracted positions as well as all intermediate positions; and to provide improved details of the links of a cross-slat form sheet metal endless band conveyer whereby such links serve the dual functions of connecting the cross-members or slats of the conveyer and of bracing and guiding the feed fingers; and to otherwise improve the details, and reduce the cost of manufacture, of such devices.

2

Figure 9:
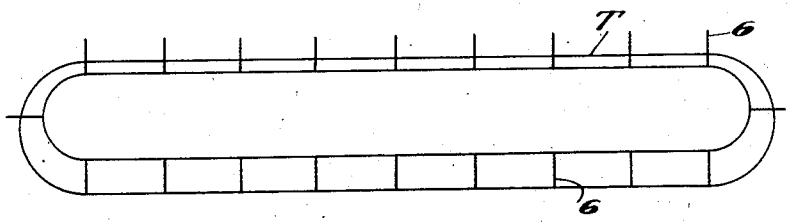
Figure 10:
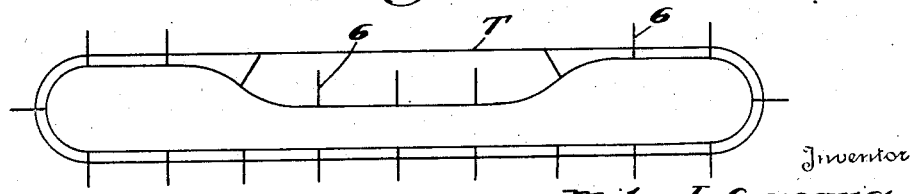

In the accompanying drawings:

Figure 1 represents a view partly in side elevation and partly in longitudinal section of a portion of an ensilage cutter in which my invention is embodied;

Figure 2, a sectional view on the line 2—2 of Fig. 3, looking in the direction of the arrows;

Figure 3, a sectional view on the line 3—3 of Fig. 2, looking in the direction of the arrows;

Figure 4, a sectional view on the line 4—4 of Fig. 2, looking in the direction of the arrows;

Figure 5, a detail elevation showing a modified form of dual connecting link and finger guide and brace;

Figure 6, a bottom plan view of such modified form of connecting link;

Figure 7, a side elevation thereof;

Figure 8, a sectional view on the line 8—8 of Fig. 6, looking in the direction of the arrows; and Figures 9 and 10, diagrammatic views showing different configurations of cam tracks for extending and retracting the fingers relative to the endless band conveyer.

Referring now in detail to the drawings, A designates a main drive pulley to be driven by a belt, not shown, in turn driven by any suitable means such as a tractor, not shown, said pulley A being keyed to shaft B to rotate the combined cutter and exhaust fan disc secured to shaft B to rotate therewith in the housing C from which the cut or chopped material is delivered or exhausted through the usual delivery spout, not shown. Said shaft B is mounted in suitable bearings secured to the frame D and in addition to driving the cutter and exhaust disc as mentioned, it also serves to drive through suitable shafting and gearing connections, not shown, the shafts N, K, P, R and V, the rolls J and O, cog-wheels Q and U, main table apron or conveyer I and the endless band conveyer or apron T comprising the cross-metal bars or slats t and 10 and the cog-links X respectively riveted at Y to the respective end portions of the cross-bars or slats t and hooked, linked or connected together in endless band form cog or sprocket chains meshing with and driven by cog-wheel Q and driving the cog-wheels U.

E designates the sides of the feeding box secured in any usual suitable known manner, as by welding, to the frame D and similarly connected respectively to the respective side plates F which may be similarly secured to the frame D and are preferably braced and tied together by means of a strap G of elongated U-shape similarly connected to the metal box sides.

Any suitable drive connection means serving to drive the shaft R or the shaft V may be employed, for instance driving connections such as set forth in my pending application, Ser. No. 573,428, filed January 18, 1945, for Feed means and driving mechanism therefor may be employed.

The construction and operation as thus far described are old and well known as is also the provision of the reversing clutch lever H keyed or otherwise suitably secured to the rod h for reversing the direction of travel of the table or main conveyer belt I to unload the machine under certain conditions.

My present invention is illustrated as embodied in the floating upper feed means of my invention set forth in my above identified application wherein the ends of the shaft R rise and fall in the arcuate slots S of the box sides E and the ends of the shaft V rise and fall in the slots or openings W of said box sides E in accordance with the variations in thickness of the layer of material being treated, a pair of levers L pivotally mounted to swing about the axis of rod or shaft Z and engaging respectively the end portions of the shaft V and pivotally connected at m to the upper ends of the links M receiving the respective end portions of the shaft R in their respective lower ends serving to connect the shaft R for movement with, and in relation to, the shaft V under certain operative conditions, all as more fully set forth in my said above identified application.

My present invention resides in combining the spacing of radius plates 1 with their cooperating flanges 2, 3, 4 defining a cam track and their outwardly extending flanges 5 functioning as supporting surfaces and the feed fingers 6 with their connecting bars 7, shanks 8 and cross-bars or anchors 9 with the perforated slats or cross-bars 10 of the endless conveyer T and the guides and braces 12 connected to said slats or cross-bars 10 in such manner that the fingers 6 will be reciprocated in a direction perpendicular, or substantially so, to the immediate outer face portion through which they extend of the respective perforated cross-bars or slats 10 and will be retracted inwardly of the loop defined by the conveyer T or projected outwardly according as the cam-tract approaches to or recedes from the endless band conveyer T and will at all times be guided, braced and held in such substantially perpendicular position and at all times supported and held in such extended or retracted positions as they may be moved to during the travel of the conveyer by broad supporting solidly backed surfaces preventing their being forced inward by other than the action of the cam-track or race as they move with the conveyer T in its endless band path.

The plates or radius bars 1 will be perforated or bored to receive the shafts R and V to maintain them in definite relation to each other, said plates being fastened to each other in any suitable manner, as by spot welding, to make a rigid construction and will preferably be held against movement axially of each of the shafts R and V by means of collars 13 and set-screws 14 threaded through said collars respectively and engaging the respective shafts R and V.

Each of said radius bars or plates 1 will preferably be formed with a flange 2 extending laterally outwardly substantially at right angles, with a narrow radially outwardly disposed flange 3 extending substantially at right angles from the extreme laterally outer portion of its flange 2 and a broad flange connected with the extreme radially outer portion of flange 3 and having a laterally inwardly presented flange portion 4 extending laterally inward beyond the radial flange 3 and a wider laterally outwardly extending portion 5 extending from the flange 3, the portions 4 and 5 of said wider axially extending flange having their outer face portions flush with each other to provide a wide supporting surface for the bars 7 connecting the fingers 6 of a given pair of feed fingers mounted on and extending through a given cross-bar or slat 10 of the endless band conveyer T.

The inner or laterally inner side edges of the flange portions 4 will be spaced from each other sufficiently to permit the travel of the shanks 8 between them about the cam track and the space defined between the opposed faces of the flanges 3 and the flanges 2 and 4 is such as to snugly slidably receive the cross-bars, heads or anchors 9 of the finger units and permit their free sliding movement therein incident to their loop form of travel movement thereabout in moving with the endless band conveyer T.

Preferably each fourth slat or cross-bar of the conveyer T will be a perforated cross-bar or slat 10 with a pair of fingers 6 respectively extending through the respective perforations therein and connected by a cross-bar 7 extending through the slots of and guided by the corresponding pair of guides 12 respectively integral with their respective base plates 11 which are respectively secured in any usual and suitable manner, as by rivets Y, against the inner faces of the respective end portions of said cross slat 10, said cross-bars or slats 10 being connected at each end portion as an endless band with the corresponding portions of the intervening cross-bars or slats t by means of links X respectively riveted at Y to the respective end portions of the respective cross-bars or slats 10 and t, said links X being formed with hooks on one end and bars on the other end, the hook of one receiving the bar of the adjacent end of the next adjacent link to make up a continuous chain endless band or loop structure, each link X being formed with a cog opening to receive and be driven by the cog teeth of cog-wheels Q and to receive the cogs of and to drive cog-wheel U, all as well shown in Figures 2, 3 and 4.

In the modification shown in Figures 5, 6, 7 and 8 the construction and operation are the same as above described except that instead of the separate guides and braces 12 and links X for the cross-bars or slats 10 I employ a single link structure embodying the cog-chain link portion X', the base portions 110 and the slotted guide and brace portions 120, the base portion being formed with a large perforation 111 to receive the corresponding finger 6 and to be arranged on the plate 10 in registry with the corresponding hole in the corresponding end portion of said cross-bar, plate or slat 10, and the link X' and the base 110 being formed with rivet holes y to receive the rivets Y to secure the same to the cross-bar or slat 10.

Figures 9 and 10 are illustrative diagrammatically of two additional of a possible large number of different cam formations by which the fingers may be extended or retracted at various points in their cycle of movement.

Side plates or covers e may be applied at the respective sides of the unitary conveyer structure by being slipped over the respective ends of the respective shafts R and V and of the bearings in which said respective end portions are journaled, all as shown in Figures 1, 2, 3 and 4, said plates e serving to prevent the entrance of excessive litter or of large masses of the material being treated into the space between the conveyer flights and clogging the parts to prevent, or interfere with, the proper working of the conveyer and finger mechanisms. Said plates or covers e will also complement the plates 1 in maintaining the shafts R and V in proper relation to each other.

In the assembly of the parts, the heads 9 may be inserted in the channel of the cam-track before the plates 1 are secured together, or the slot or passageway may be of such width that the heads 9, together with the cross-bars 7, may be turned at right angles to their operative positions to extend lengthwise of the plates 1, inserted through the slot when thus disposed and then turned to be disposed cross-wise of such slot or passageway, or a part of the cam-track or portions of flanges 4 may be made removable, being normally secured in place by screws, so that upon the removal of such portions of the flanges 4 the heads 9 together with their stems 8, cross-bars 7 and fingers 6 may be removed or replaced as desired, or any other suitable and usual constructions and means permitting the insertion, removal and replacement of such parts may be resorted to, the exact means employed for this purpose being immaterial and forming no part of my present invention.

I claim:

1. An endless band conveyer comprising a plurality of metal cross-slats including a plurality of slats having perforated end portions and link connections between adjacent slats to connect them in an endless band, a pair of shafts extending between the runs of said conveyer respectively adjacent the respective ends of the loop of said conveyer, means mounted on the respective shafts and respectively engaging the inner faces of the respective ends of said loop, and a rigid radius member extending about both of said shafts to maintain them in definite relative spaced relation, in combination with feed fingers respectively extending through the respective perforations of the respective perforated slats, pairs of slotted guides respectively secured to the respective perforated slats, cross-bars integral with the respective feed fingers of the respective perforated slats and respectively extending through the slots of and guided by the respective pairs of guides, stems respectively integral with and extending from the respective cross-bars and heads respectively integral with and extending on both sides of the respective stems substantially parallel with the cross-bars, and a cam-track carried by said radius member and extending in an endless loop thereabout approaching said conveyer at some points and receding from it at others and receiving said heads and having radially outer walls disposed between said cross-bars and heads to alternately engage the same to reciprocate the same and the fingers carried by the respective cross-bars, said walls being spaced from each other to form a passage for the travel of the stems about the cam-track.

2. An endless band conveyer having an opening in its endless band, a pair of shafts extending between the runs of said conveyer respectively adjacent the respective ends of the loop of said conveyer, means respectively mounted on the respective shafts and respectively engaging the inner faces of the respective ends of said loop, and a rigid radius member extending about both of said shafts to maintain them in definite relative spaced relation, in combination with a feed finger extending through said opening, a pair of slotted guides secured to said conveyer, means integral with said feed finger and extending through the slots of and guided by said pair of guides, a stem integral with and extending from said means, and a head integral with and extending from said stem on both sies thereof, and a cam track carried by said radius member and extending in an endless loop thereabout approaching said conveyer at some points and receding from it at others and receiving said head and having radially outer walls disposed between said means and head to alternately engage the same to reciprocate the same and the finger carried by the said means, said walls being spaced from each other to form a passage for the travel of said stem about the cam-track.

3. An endless band conveyer comprising a plurality of metal cross-slats including a perforated slat and link connections between adjacent slats to connect them in an endless band, in combination with a feed finger extending through said perforated slat, a pair of slotted guides secured to said perforated slat, means connected with said feed finger and extending through the slots of and guided by said pair of guides, a stem extending from said means, and a head connected with said stem, and a cam-track rigidly mounted in fixed position and of such contour as to approach said conveyer at some points and recede from it at others and receiving said head and having spaced flanges disposed between said means and head to alternately engage the same to reciprocate the same and the finger carried by said means, said flanges being spaced from each other to form a passage for the travel of said stem about said cam-track.

4. A connecting and guiding link to be applied to a flexible traveling conveyer structure to connect links on each end of it and to guide a member mounted for reciprocatory movement with relation to said conveyer, said link comprising an offset body portion formed with a socket to receive a cog-tooth of a cog-wheel, perforated portions integral with said body portion to receive fastening means for securing the link to said conveyer, and a slotted guide portion integral with and extending substantially at right angles from one of said perforated portions.

5. A connecting and guiding link to be applied to a flexible traveling conveyer structure to connect links on each end of it and to guide a member mounted for reciprocatory movement with relation to said conveyer, said link comprising a body portion formed with a hook on one end and a cross-bar on the other end, perforated portions integral with said body portion to receive fastening means for securing the link to said conveyer, and a slotted guide portion integral with and extending substantially at right angles from one of said perforated portions.

6. A connecting and guiding link to be applied to a flexible traveling conveyer structure to connect links on each end of it and to guide a member mounted for reciprocatory movement with relation to said conveyer, said link comprising a body portion formed with a hook on one end and a cross-bar on the other end, perforated portions integral with said body portion to receive fastening means for securing the link to said conveyer, and a guide portion integral with and extending substantially at right angles from one of said perforated portions, said latter perforated portion being formed with a hole to receive and permit the reciprocatory movement therethrough of such member.

MILES L. SENSENIG.